US011318648B2

(12) United States Patent
Schmidhuber et al.

(10) Patent No.: US 11,318,648 B2
(45) Date of Patent: May 3, 2022

(54) METHOD FOR PRODUCING A COMPOSITE PART

(71) Applicant: KRAUSSMAFFEI TECHNOLOGIES GMBH, Munich (DE)

(72) Inventors: Sebastian Schmidhuber, Munich (DE); Nicolas Beyl, Munich (DE)

(73) Assignee: KRAUSSMAFFEI TECHNOLOGIES GMBH, Munich (DE)

(*) Notice: Subject to any disclaimer, the term of this patent is extended or adjusted under 35 U.S.C. 154(b) by 0 days.

(21) Appl. No.: 16/972,205

(22) PCT Filed: Oct. 31, 2018

(86) PCT No.: PCT/EP2018/079803
§ 371 (c)(1),
(2) Date: Dec. 4, 2020

(87) PCT Pub. No.: WO2020/001799
PCT Pub. Date: Jan. 2, 2020

(65) Prior Publication Data
US 2021/0229331 A1    Jul. 29, 2021

(30) Foreign Application Priority Data
Jun. 26, 2018   (DE) .................... 10 2018 115 291.4

(51) Int. Cl.
*B29C 45/16*   (2006.01)
*B29C 45/37*   (2006.01)
(52) U.S. Cl.
CPC ...... *B29C 45/1679* (2013.01); *B29C 45/1628* (2013.01); *B29C 45/1671* (2013.01); *B29C 45/37* (2013.01)

(58) Field of Classification Search
None
See application file for complete search history.

(56) References Cited

U.S. PATENT DOCUMENTS

| 4,089,922 A | * | 5/1978 | Saito | B29C 45/16 264/108 |
| 5,098,272 A | | 3/1992 | Joseph | |
| 5,656,215 A | | 8/1997 | Eckardt | |
| 5,800,751 A | * | 9/1998 | Barker | A46B 5/02 264/243 |

(Continued)

FOREIGN PATENT DOCUMENTS

| DE | 4414258 A1 | 10/1995 |
| DE | 100 09 304 A1 | 9/2001 |

(Continued)

OTHER PUBLICATIONS

International Search Report for PCT/EP2018/079803 dated Feb. 25, 2019.

*Primary Examiner* — Edmund H Lee
(74) *Attorney, Agent, or Firm* — Pearne & Gordon LLP

(57) ABSTRACT

A method for producing a composite part. According to the method, a substrate is provided, the substrate having an integrated mixing portion for mixing a component system close to the substrate. The substrate provided is introduced into a cavity of a coating tool in an additional step. The substrate is then coated by flooding the cavity with the component system. The component system is mixed inside the cavity by means of the mixing portion of the substrate.

12 Claims, 4 Drawing Sheets

(56) References Cited

U.S. PATENT DOCUMENTS

| | | | | |
|---|---|---|---|---|
| 6,660,196 | B1 * | 12/2003 | Iwase | B29C 45/1634 |
| | | | | 264/245 |
| 7,303,714 | B2 * | 12/2007 | Matsuzaki | B29C 45/14598 |
| | | | | 264/259 |
| 2006/0118999 | A1 | 6/2006 | Cooper | |
| 2018/0029312 | A1 | 2/2018 | Reith | |

FOREIGN PATENT DOCUMENTS

| | | |
|---|---|---|
| DE | 10 2009 016 432 A1 | 10/2010 |
| EP | 1348530 A2 | 10/2003 |
| EP | 2899008 A1 | 7/2015 |
| JP | H08309789 A | 11/1996 |
| JP | H0952262 A | 2/1997 |
| JP | 2005335123 A | 12/2005 |
| JP | 2006103187 A | 4/2006 |
| WO | 2014064155 A1 | 5/2014 |
| WO | 2017097444 A1 | 6/2017 |

* cited by examiner

METHOD FOR PRODUCING A COMPOSITE PART

CROSS-REFERENCE TO RELATED APPLICATIONS

This is a National Stage application of PCT international application PCT/EP2018/079803 filed on Oct. 31, 2018, which claims the priority of German Patent Application No. 10 2018 115 291.4, filed Jun. 26, 2018, which are incorporated herein by reference in their entireties.

TECHNICAL FIELD

The present invention relates to a method for producing a composite part.

BACKGROUND

The production of composite parts, in which a thermoplastic base carrier is provided with a coating, is known in the prior art. The finishing of surfaces is known as an example of the production of composite parts. Here, the need exists to provide substrates, produced in a first partial step or fed separately, in a second step with a higher-quality surface coating. Multi-component systems, for example duroplastic lacquers, are known for surface coating, which consist of several liquid components. These liquid components must be mixed for the formation of a reactive mixture.

The quality of the surface which is to be produced depends inter alia on the quality of the mixing of the liquid components. For mixing, frequently the so-called high-pressure counter flow injection method is used, in order to be able to use highly reactive liquid components for short curing times. Also, owing to relatively high occurring tool internal pressures, preferably the use of high pressure technology takes place.

The core of the so-called high pressure technology forms a particular, partly cost-intensive and technically partly demanding metering- and mixing device, also known as a metering machine. In such metering machines, a so-called mixing head is used for the mixing of the liquid components. In this way, the processing of rapidly reacting raw material systems is possible. However, in addition to the high costs for this technology, disadvantages relating to process technology are also frequently associated. For example, intensively rising tool internal pressures can have a negative effect on the mixing. Furthermore, flit, cross-contamination of the raw materials, mechanical difficulties in the mixing head as a result of sealing- and material combination tasks and problems in the wear resistance, can arise. In the case of maintenance, the mixing head must be dismantled from the tool if necessary and repaired in a time/cost-intensive manner, which can be accompanied by downtimes.

U.S. Pat. No. 5,098,272 A describes a device for forming a metal-elastomer composite wheel, in which a central moulded part contains a metal wheel disc and a rim assembly. A base mould part lies in the closed state of the mould against the outer surface of the metal wheel and has a mould cavity surface, in order to provide a decorative configuration for the outer surface of the decorative plastic body of the composite wheel. A clamp lies against the inner side of the central mould part, in order to bring the central part in sealing engagement with the base mould part. The mould parts are axially separable from one another, in order to open the moulding device and to free the central mould part from the clamping- and base mould parts.

US 2018/029 312 A1 discloses a method for the production of plastic components, in particular of composite components, using at least two components, which are to be mixed, in a mixing chamber and a cavity formed between a first and a second half of a moulding tool, wherein the cavity has a mould part region and a gate region, wherein the gate region or the mould part region of the cavity is used as mixing chamber.

SUMMARY OF THE INVENTION

It is therefore the object of the invention to indicate a solution by which the production of composite parts can be realized at a more favourable cost and more efficiently.

The problem is solved by a method for the production of a composite part according to claim 1.

Advantageous further developments are the subject of the dependent claims.

According to the invention, a particularly formed substrate is used for the production of a composite part. In the production method, the substrate is introduced into a cavity of a coating tool and is coated with a component system. The substrate has a mixing portion for mixing the component system close to the substrate.

A substrate is understood to mean a component, for example a carrier component or base carrier. This component is coated at least in certain areas with the component system in the coating tool. The coating can take place by a flooding of the substrate with the component system. The substrate can remain at least partially in the finished composite part. Such a substrate can be, for example, a planar component. The component system can be a multi-component system, for example a lacquer or a duroplast material, e.g. a PUR- or PUA material. Instead of a multicomponent system, however, single-component coasting systems can also be used.

The mixing portion of the substrate can be formed so that during the flowing-through or flowing-over of the mixing portion a targeted redirecting/circulating of the component system takes place with the effect of a mixing or post-mixing. The mixing portion therefore serves as a device for mixing the component system in which solely the flow motion brings about the mixing. The mixing portion is accordingly formed so that it can influence a flow of the fed component system in the vicinity of the substrate in a targeted manner. In the context of the invention, a mixing close to the substrate is to be understood to mean a mixing or post-mixing on the substrate or respectively in the immediate vicinity of the substrate. This means that a mixing takes place always on the basis of the constitution of the substrate and irrespective of the way in which the component system is fed. The feed can take place for example by a mixing- or metering head.

The mixing portion is an integral portion of the substrate. Through the integration of the mixing portion into the substrate, it is also possible, if applicable, to change from the complex high-pressure technology described above to the simpler so-called mixing- and metering technology (e.g. lower pressure level), whereby a considerable cost reduction becomes possible. Furthermore, through integration of the mixing portion into the substrate, the mixing portion is jointly demoulded from the coating tool in a demoulding of the component, taking place later, and can thus be separated from the finished component by way of a post-processing of the component, for example by trimming, milling or stamping. As the mixing portion does not remain the coating tool, it does not have to be cleaned, whereby a cleaning of the component which is to be mixed is dispensed with. Moreover, material particles which have remained in the mixing portion if applicable from the preceding cycle can then no longer cause any defects in the following cycle. The integration of the mixing portion into the substrate has the advantage, furthermore, that a manual inserting, or an inserting which is only automatable in a costly manner, of the mixing portion into the coating tool is dispensed with.

The substrate has a moulded part portion remaining in the composite part which is to be produced, which moulded part portion is able to be arranged in a moulded part region of the cavity of the coating tool. The mixing portion is formed for the separation from the composite part which is to be produced and for arranging in a mixing region of the cavity. The substrate can accordingly have two portions, the first of which, i.e. the moulded part portion, remains in the finished component or respectively composite part, and the other portion, i.e. the mixing portion, is subsequently separated from the composite part which is to be produced.

The mixing portion is formed here so that the latter, when the substrate is placed in the cavity of the moulding tool, then influences a flow of the component system to the moulded part portion in such a way that it is mixed. Preferably, the mixing portion is provided in an edge region of the substrate, in particular on an edge region of the moulded part portion.

The mixing portion can have a base portion. In particular, the base portion can be formed in a plate-like manner. The moulded part portion of the substrate can likewise be formed in a plate-like manner and can directly adjoin the base portion. The moulded part portion can be an extension of the base portion, i.e. can be connected with the moulded part portion without a special or noticeable transition. In particular, the moulded part portion can be connected with an edge of the base portion or respectively can extend away therefrom. The moulded part portion can be, for example, a laminar element with a substantially constant wall thickness.

Preferably, the mixing portion has several elements influencing the flow and adjusting the (post-) mixing effect. Flow-influencing elements can be, for example, projections and/or depressions in or respectively on the substrate, more precisely on the mixing portion of the substrate. The flow-influencing elements can be, for example, shaped projections. The flow-influencing elements are preferably formed so that they influence the flow of a material flowing along the substrate. Accordingly, the flow-influencing elements are formed so that they extend away from an area of the substrate which prescribes a flow direction. This area is preferably the area of the substrate which is to be coated. The flow-influencing elements can for example substantially also extend perpendicularly or respectively at right angles to the area of the substrate prescribing the flow direction. In the mixing portion, the area prescribing the flow direction can be a surface of the plate-like base portion as described above. The flow-influencing elements then extend away from this surface, so that a material flowing along the surface impinges onto the flow-influencing elements and must flow between these. As already mentioned above, the base portion can be formed in a plate-like manner. The flow-influencing elements can extend for example substantially perpendicularly away from this plate-like portion.

According to a preferred embodiment, the substrate has, furthermore, a run-out region for calming the component system for the laminar flow. The run-out region can be arranged in flow direction following the mixing portion.

The moulded part portion can be arranged for carrying a semi-finished product which is to be coated. In particular, the moulded part portion can have an area on which a semi-finished product which is to be coated can be fastened or respectively carried. During the coating of the substrate, the component system is then applied onto the semi-finished product which is to be coated, whereby the semi-finished product is securely connected with the substrate. Preferably, the semi-finished product which is to be coated is a thermoplastic base carrier, a veneer, for example a real wood veneer, a fibre-reinforced semi-finished product or a textile semi-finished product. It is also possible to provide combinations of different semi-finished products as semi-finished product which is to be coated.

The substrate can be formed for a direct coating, therefore provided without an additional semi-finished product situated thereon. To improve the adhesion characteristics of the substrate, the area of the substrate which is to be coated can be activated, for example by flame-treating or by a plasma treatment. In this way, the adhesion between the substrate material and the coating which is to be applied or respectively the component system can be improved.

The substrate can be produced by injection moulding of a thermoplastic material.

In addition, a tool is created for the production of a composite part using a substrate as described above. As already mentioned above, the substrate has a moulded part portion, remaining in the composite part which is to be produced, and a mixing portion which is to be separated from the composite part which is to be produced. The tool has a coating tool with two mould halves for the formation of a cavity. The cavity has a moulded part region and a mixing region. Furthermore, the coating tool has a gating system for feeding the component system to the cavity.

The moulded part region of the coating too is formed for receiving the moulded part portion of the substrate. The mixing region of the coating tool is formed for receiving the mixing portion of the substrate. The mixing region can be formed considerably smaller compared to the moulded part region. The gating system is connected with the moulded part region via the mixing region. The gating system can have a flow channel for the component system and opens into the mixing region. Accordingly, a component system which is fed via the gating system flows firstly through the mixing region and subsequently through the moulded part region of the cavity. With an inserted substrate, the latter is accordingly firstly flowed over in the region of the mixing portion before the material reaches the moulded part portion, so that in the region of the moulded part portion or respectively in the moulded part region a sufficiently homogeneously mixed component system is present.

The tool can have, furthermore, a moulding tool for the production of the substrate. The moulding tool can have two mould halves for the formation of a cavity, which has a moulded part region and a mixing region. The mixing region of the cavity is arranged for the formation of the mixing portion on the substrate. The cavity of the moulding tool is formed smaller compared to the cavity of the coating tool.

The tool can be arranged to transfer the substrate by shifting the cavity from the moulding tool into the coating tool. A shifting of the tool cavity can be realized for example by means of a turntable, turning plate or sliding table. The use of such technologies has the advantage that the production of a substrate can take place synchronously with a further processing of the substrate. More precisely, for example, the substrate can be produced in the moulding tool by an injection moulding process whilst at the same time a substrate which was produced in the previous cycle is provided with a surface coating in the cavity of the coating tool.

Furthermore, a machine is created for the production of a composite part with a clamping unit, an optional injection unit, a feeding device for the feeding of liquid components of a component system, and with a tool of the type described above, received in the clamping unit.

According to the invention, a method is created for the production of a composite part. The method comprises the steps of placing a substrate, as described above, in a cavity of a coating tool and coating the substrate by flooding the cavity with a component system. Here, a mixing takes place of the component system close to the substrate on the basis of the constitution or respectively the form of the substrate. During the flowing through or flowing over of the mixing portion, the component system is mixed in the cavity of the coating tool.

According to a preferred embodiment, the method has the step of providing a substrate, as described above, wherein the substrate can have a moulded part portion, remaining in the composite part which is to be produced, and the mixing portion, which is preferably separated from the composite part which is to be produced. In the coating step described above, the component system flows through the mixing portion of the substrate, whereby it is mixed before it reaches the moulded part portion.

A flowing through the mixing portion is to be understood to mean such a flowing of a liquid material in which the material flows through at least between two portions of the mixing portion, for example the above-mentioned flow-influencing elements or portions.

According to a preferred embodiment, the step of providing the substrate comprises a producing of the substrate by injection moulding, in particular by injection moulding of a thermoplastic material.

The coating of the substrate can take place simultaneously with the producing of a further substrate.

According to a preferred embodiment, the method has furthermore the step of demoulding of the coated substrate from the moulding tool and separating of the mixing portion from the composite part.

According to a preferred embodiment, during the coating step of the method, the component system is fed in the form of at least two liquid components, which are substantially unmixed. A mixing of the component system takes place here substantially in the cavity of the coating tool. Alternatively, the component system or respectively its liquid components can be fed in a pre-mixed manner, so that a post-mixing of the component system takes place in the mixing region of the cavity.

DETAILED DESCRIPTION OF AN EXAMPLE EMBODIMENT

An embodiment of the invention is described below with reference to the figures. The same reference numbers in the figures characterize identical or similar elements.

Figure 1:
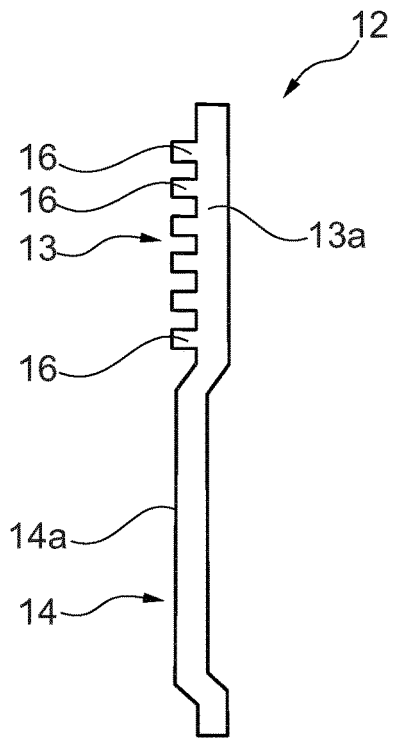
FIG. 1 shows a cross-sectional view of a substrate, as it is used in the method according to the invention.

FIG. 1 shows a side view of a substrate 12 according to an embodiment of the present invention. More precisely, FIG. 1 shows a sectional view.

The substrate 12 has a moulded part portion 14 and a mixing portion 13. Although this is not illustrated in FIG. 1, the substrate 12 is a laminar component, in which both the moulded part portion 14 and also the mixing portion 13 extend perpendicularly to the plane of the drawing. The substrate can, however, also be a contoured to three-dimensional component. In the embodiment, the mixing portion 13 has a smaller width than the moulded part portion 14, can, however, also have the same width or a greater width than the moulding portion 14. As is indicated in FIG. 1, the moulded part portion 14 has an area 14a which in the course of the processing of the substrate 12 is to be provided with a layer of a component system. In order to ensure an adhesion between the duroplastic material and the substrate 12 in the region of the moulded part portion 14, the area 14a can be subjected, in advance, to a corresponding surface treatment.

The mixing portion 13 of the substrate 12 has flow-influencing elements 16. In FIG. 1 six of these flow-influencing elements 16 can be seen. In the embodiment which is shown, the flow-influencing elements 16 are formed by way of example as cylindrical projections, all of which have the same height. The flow-influencing elements 16 extend substantially perpendicularly to a main extent direction of the substrate 12, in particular at right angles to a plate-like base portion 13a. According to a corresponding design, the main extent direction can correspond for example to the longitudinal direction of the substrate.

Figure 5:
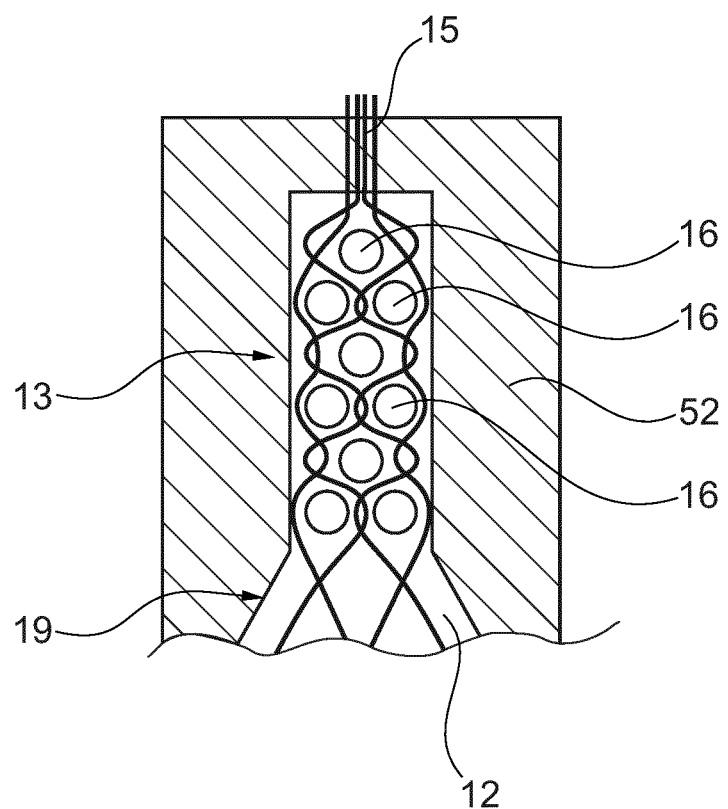
FIG. 5 shows an enlarged illustration of a mixing portion of the substrate shown in FIG. 1.

The configuration of the flow-influencing elements 16 can also be seen from FIG. 5, which shows a front view of the mixing portion 13 of the substrate 12, therefore a view from the left onto the substrate 12 shown in FIG. 1. However, the substrate 12 in FIG. 5 is inserted into a coating tool 5, which is described later in further detail. As is already indicated in FIG. 5, the flow-influencing elements 16 serve for the mixing of a component system 15. The mixing portion 13 acts here as a static mixer for the mixing of liquid components of the component system 15.

Figure 2:
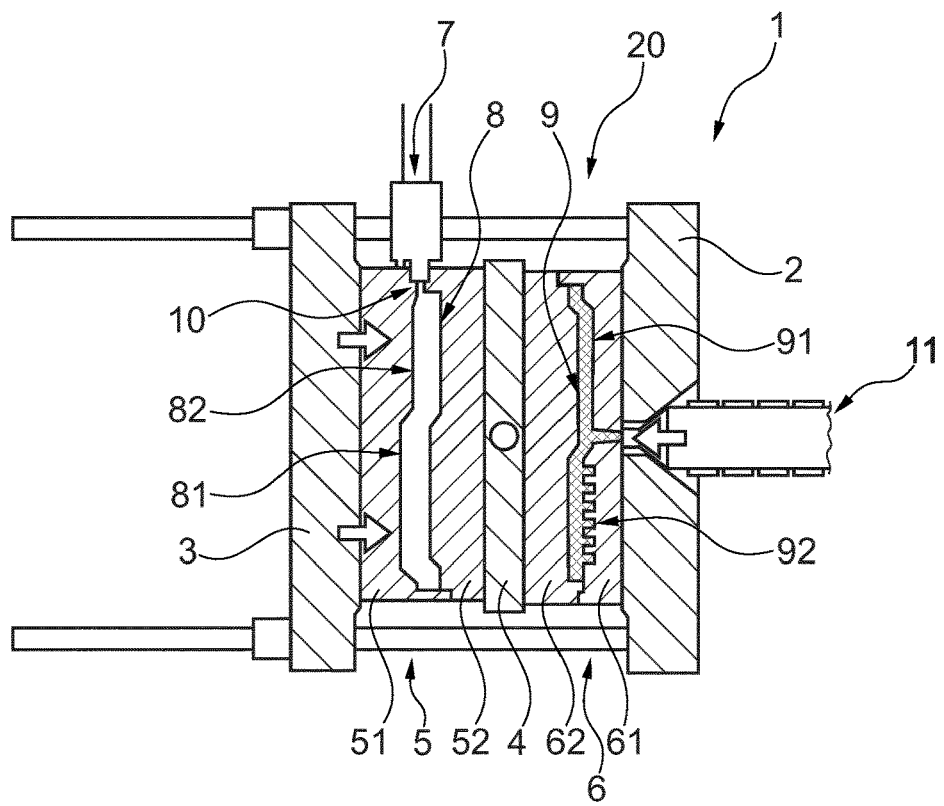
FIGS. 2 to 4 show a tool for the production of a composite part using the substrate shown in FIG. 1 in various operating states.
Figure 3:
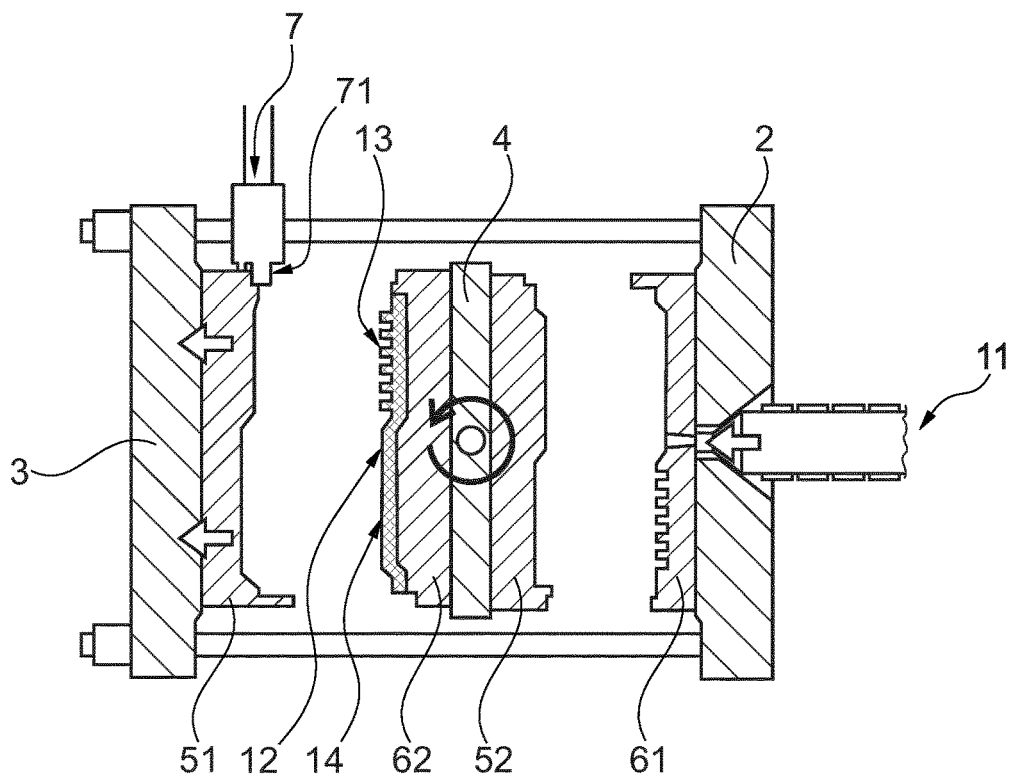
Figure 4:
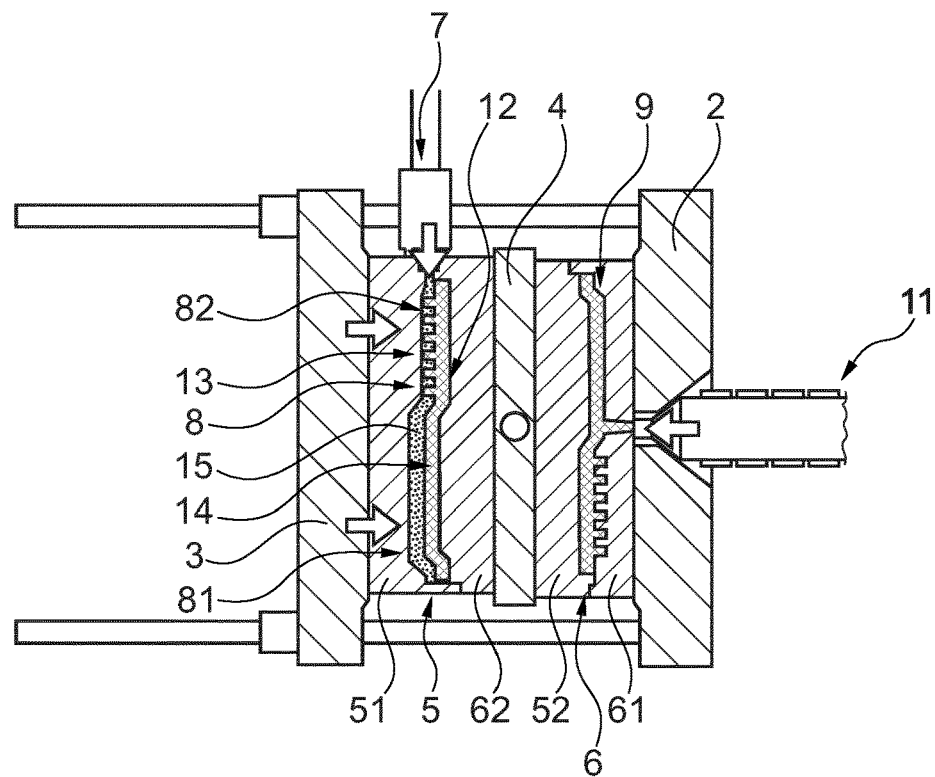

For coating the substrate 12, a machine 1 can be used, as it illustrated in FIGS. 2 to 4. The machine 1 has a clamping unit 20, an injection unit 11, a feeding device 7 for feeding the component system 15, and a tool received in the clamping unit. In the embodiment which is shown, the tool has a coating tool 5 and a moulding tool 6 for the production of the substrate. The machine 1 is accordingly formed for the production of the substrate 12.

The coating tool 5 has two mould halves 51, 52 for the formation of a cavity 8. The cavity 8 has a moulded part region 81 and a mixing region 82. A first mould half 51 of the coating tool 5 is fastened to a movable platen 3 of the clamping unit 20. A second mould half 52 of the coating tool 5 is fastened on one side of a turning plate 4 of the clamping unit 20.

The moulding tool 6 has two mould halves 61, 62 for the formation of a cavity 9. The cavity 9 has a moulded part region 91 and a mixing region 92. The mixing region 92 serves for the formation of the mixing portion 13 of the substrate 12. A first mould half 61 of the moulding tool 6 is fastened to a fixed platen 2 of the clamping unit 20. A second mould half 62 of the moulding tool 6 is fastened on the opposite side of the turning plate 4.

The coating tool 5 has, furthermore, a gating system 10 for the feeding of a component system 15 to the cavity 8. As is shown in FIG. 2, the gating system 10 consists substantially of a channel or respectively a flow channel, via which the component system 15 can be fed from a feeding device 7 into the cavity 8. In the embodiment which is shown, the channel or respectively the gating system 10 is provided on the upper side of the coating tool 5. The feeding device 7 is able to be fluidically connected with the gating system 10, and the gating system 10 opens into the cavity 8 via a gate, which is not illustrated.

The cavity 8 is formed in an enlarged manner compared to the cavity 9. The cavity 8 consists of a mixing region 82 and a moulded part region 81. The mixing region 82 is formed for receiving the mixing portion 13 of the substrate 12. FIG. 5 shows an enlarged view of the mixing portion 13, which is inserted into the mould half 52 of the coating tool 5.

The cavity 8 has, furthermore, a moulded part region 81, which is arranged to receive the moulded part portion 14 of the substrate 12. As can be seen from FIG. 4, the cavity 8 is formed so that an introduced component system 15 firstly must flow through the mixing region 82 of the cavity 8, in order to arrive into the moulded part region 81 of the cavity 8. As the mixing portion 13, described above, is arranged in the mixing region 82 of the cavity 8, the component system 15 flows between the flow-influencing elements 16, as is indicated in FIG. 5. In this way, the component system 15 is mixed. The component system 15 can be fed in the form of substantially unmixed liquid components. If this is the case, the liquid components of the component system 15 are only mixed by the mixing portion 13. The mixture which has thus resulted then arrives into the moulded part region 81, in which the moulded part portion 14 of the substrate 12 is situated. The area 14*a* of the moulded part portion 14 is flooded in this way with the mixed component system 15. After a corresponding curing of the component system 15 on the substrate 12, the composite part which has thus resulted can be demoulded from the coating tool 5.

The production of a composite component 17 is described in more detail below with reference to FIGS. 2 to 7.

FIG. 2 shows an operating state of the machine 1 for carrying out the method according to the invention. More precisely, a state after a first shot is illustrated. During the first shot, the cavity 9 of the moulding tool 6, therefore of the injection moulding tool, has been filled by means of the injection unit 11 in a known manner with an injection-mouldable plastic material. In this way, the substrate 12 was formed in the form of an injection-moulded blank. No action took place in the cavity 8 of the coating tool 5, for which reason it is empty in the operating state which is shown.

After the first shot, therefore after the production of the substrate 12, the coating tool 5 and the moulding tool 6 are opened. Here, the substrate 12 remains on the moulding tool half 62, which is associated with the turning plate 4. The turning plate 4 is then rotated through 180°, so that the moulding tool half 62, which carries the substrate 12, is arranged opposite the moulding tool half 51. Together with the moulding tool half 62, the moulding tool half 52, provided on the opposite side of the turning plate 4, is also moved. In this way, the moulding tool half 52 is arranged opposite the moulding tool half 61. The moulding tool halves 52 and 61 now form the moulding tool 6, and the moulding tool halves 51 and 62 form the coating tool 5. This operating state is shown in FIG. 3. Alternatively, instead of a system with a turning plate, for example also a system with a sliding table can be used, in order to shift the moulding tool halves.

The moulding tool 6 now has in turn a cavity 9 for the injection moulding of a further injection-moulded blank or respectively substrate 12*a*. The substrate 12, produced previously or respectively with the preceding shot, is situated in the cavity 8 of the coating tool 5. With this positioning of the moulding tool halves, the coating tool 5 and the moulding tool 6 are closed. After the closing process, simultaneously the further substrate 12*a* in the moulding tool 6 is injected and the previously produced substrate 12 in the coating tool 5 is provided with the component system 15, which for example is a lacquer coating or a duroplast coating, e.g. a PUR- or PUA coating. This operating state is shown in FIG. 4.

The substrate 12 is arranged in the cavity 8 so that the mixing portion 13 is arranged in the mixing region 82 of the cavity 8, and the moulded part portion 14 is arranged in the moulded part region 81 of the cavity 8. In the embodiment which is shown, the mixing portion 13 or respectively the flow-influencing elements provided therein are arranged so that these project substantially up to an inner wall of the coating tool 5, so that a flowing through of the mixing region 82 of the cavity 8 is only possible when the component system 15 flows through between the flow-influencing elements 16.

As already set forth above, the coating tool 5 has the gating system 10, through which the component system 15 or respectively its liquid components are fed to the cavity 8, more precisely to the mixing region 82. The component system 15, introduced via the gating system 10, therefore flows over the mixing region 82 of the cavity 8 to the moulded part region 81 of the cavity 8. Here, the component system 15 or respectively its liquid components flow through the mixing portion 13 of the substrate 12, more precisely between the flow-influencing elements 16, whereby the component system 15 or respectively its liquid components are mixed.

The mixing portion 13 acts in the cavity 8 as a static mixer or respectively a static mixing device. In the flow course through the mixing region 82, the material stream which is introduced via the gating system 10, or respectively the component system 15 which is introduced, is divided into several partial streams and at the end of the mixing region is directed together again to one stream. The mixed component system 15 then flows into the moulded part region 81 of the cavity 8, in which the moulded part portion 14 of the substrate is situated. The area 14*a* of the substrate 12, facing the interior of the cavity 8, is flowed over in this way with the mixed component system 15. After a completed entire flooding of the cavity 8 with the component system 15, an at least partial curing of the component system 15 takes place. The coating process is thereby completed.

Figure 6:
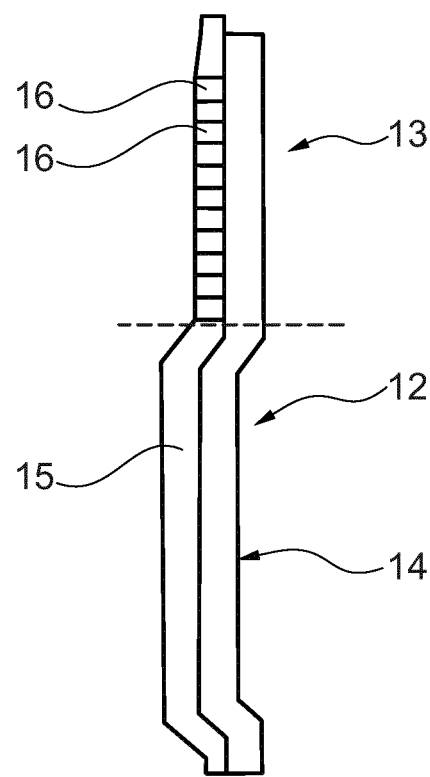
FIG. 6 shows the substrate, shown in FIG. 1, in coated state.

After the injection moulding of the further substrate 12*a* in the cavity 9, and the completed coating of the substrate 12 in the cavity 8, the coating tool 5 and the moulding tool 6 are opened. The substrate 12, coated with the component system 15, is demoulded from the coating tool. The intermediate product which has thus resulted is shown in FIG. 6. The substrate 12*a*, produced in the cavity 9, is subsequently provided with a coating in a further cycle step in the cavity 8 in the manner described above.

Figure 7:
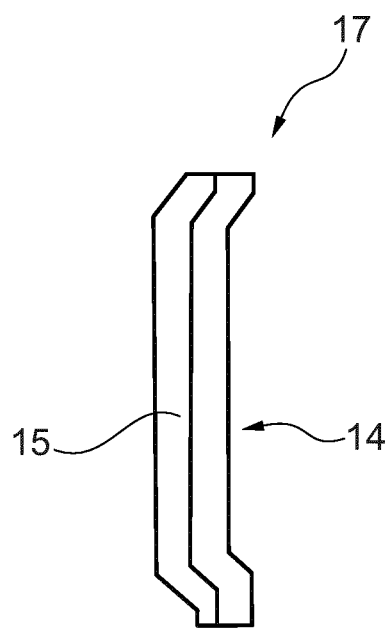
FIG. 7 shows a finished composite part.
Figure 8:
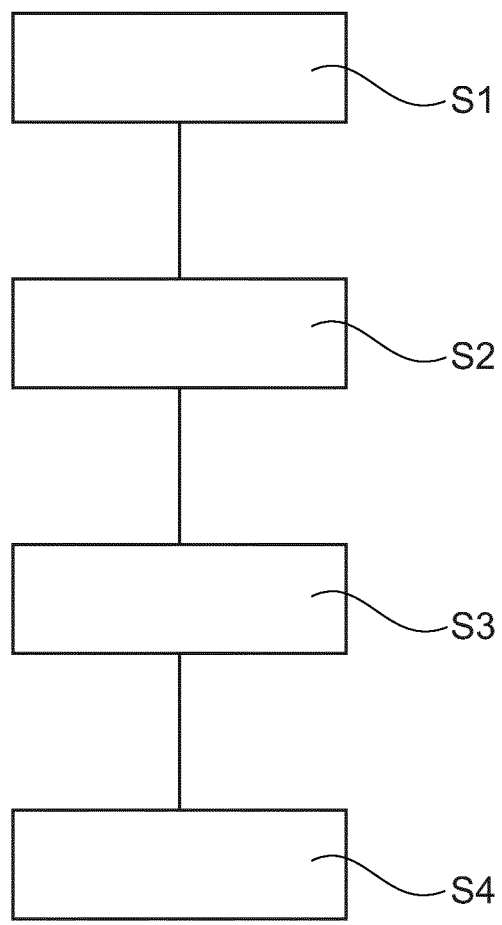
FIG. 8 shows method steps of the method according to the invention for the production of a composite part.

The intermediate product shown in FIG. 6 consists of the substrate 12 and a layer of the cured component system 15. In a post-processing step, the mixing portion 13 of the substrate together with component system 15 situated thereon is separated from the moulded part portion 14 together with the component system 15 situated thereon, as is illustrated by a dashed line in FIG. 6. In this way, the desired composite part 17 is obtained, as is illustrated in FIG. 7.

The substrate 12 can be an injection-moulded blank, as was described above. A modification of the machine 1 described above can have exclusively a coating tool and therefore no moulding tool for the production of the substrate. The substrate can be produced with a separate machine and at a different location. Into the machine according to the modification, the substrate can then be inserted into the coating tool in an automated manner, for example by means of a gripper or a robot arm. The component system can be a multi-component cross-linking coating system, e.g. a lacquer system or a duroplast coating. Duroplast materials can be, for example, PUR- or PUA materials.

LIST OF REFERENCE NUMBERS 1 machine
5 coating tool
6 moulding tool
7 feeding device
8 cavity
10 gating system
11 injection unit
12 substrate
13 mixing portion
13a base portion
14 moulded part portion
15 duroplastic material
16 flow-influencing elements
17 composite part
19 run-out region
20 clamping unit
51, 52 mould halves
61, 62 mould halves
81 moulded part region
82 mixing region
91 moulded part region
92 mixing region
S1 providing
S2 placing
S3 coating
S4 demoulding

The invention claimed is:

1. A method for the production of a composite part, in which a substrate is coated with a component system, wherein the method has the following steps:
providing a substrate, with a moulded part portion remaining in the composite part which is to be produced and with an integrated mixing portion, to be separated from the composite part which is to be produced, for the mixing of the component system close to the substrate;
introducing the substrate into a cavity of a coating tool;
coating the substrate by flooding the cavity with the component system, wherein the component system is mixed by the mixing portion of the substrate in the cavity before it reaches the moulded part portion; and
demoulding of the coated substrate from the moulding tool and then separating the mixing portion from the coated substrate to obtain the composite part.

2. The method according to claim 1, wherein the mixing portion has several flow-influencing elements comprising projections and/or depressions.

3. The method according to claim 2, wherein the substrate is provided furthermore with a run-out region for calming the component system, which run-out region is provided after the mixing portion in the flow direction.

4. The method according to claim 1, wherein the moulded part portion of the provided substrate is arranged for carrying a semi-finished product which is to be coated, or already carries one such.

5. The method according to claim 4, wherein the semi-finished product which is to be coated has a real wood veneer, a fibre-reinforced semi-finished product or a textile semi-finished product.

6. The method according to claim 1, wherein the providing of the substrate comprises a producing of the substrate by injection moulding of a thermoplastic material.

7. The method according to claim 6, wherein the coating of the substrate and the production of the substrate takes place in the same machine.

8. The method according to claim 7, wherein the coating of a produced substrate takes place simultaneously with the producing of a further substrate.

9. The method according to claim 8, wherein for the production of the substrate a moulding tool with two mould halves is used for the formation of a cavity, which has a moulded part region for the formation of the moulded part portion and a mixing region for the formation of the mixing portion.

10. The method according to claim 9, wherein the substrate is transferred by shifting the cavity from the moulding tool into the coating tool.

11. The method according to claim 1, wherein the component system comprises at least two liquid components that are fed, in a substantially unmixed manner, so that a mixing of the component system takes place in the cavity.

12. The method according to claim 1, wherein the component system comprises at least two liquid components that are fed in a pre-mixed manner, so that a post-mixing of the component system takes place in the cavity.

* * * * *